United States Patent
Miller et al.

(10) Patent No.: US 6,529,212 B2
(45) Date of Patent: *Mar. 4, 2003

(54) AUTOMATIC LUMINANCE AND CONTRAST ADJUSTMENT AS FUNCTIONS OF AMBIENT/SURROUND LUMINANCE FOR DISPLAY DEVICE

(75) Inventors: Michael E. Miller, Rochester, NY (US); James R. Niederbaumer, Webster, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/940,999

(22) Filed: Aug. 28, 2001

(65) Prior Publication Data

US 2002/0024529 A1 Feb. 28, 2002

Related U.S. Application Data (63) Continuation of application No. 08/970,327, filed on Nov. 14, 1997.

(51) Int. Cl.[7] ............................. G09G 5/10; G09G 3/36; H04N 5/58
(52) U.S. Cl. ........................ 345/690; 345/102; 348/602
(58) Field of Search ............................... 345/690, 102; 348/602, 603, 222, 227

(56) References Cited

U.S. PATENT DOCUMENTS

| | | | |
|---|---|---|---|
| 3,622,696 A | * 11/1971 | MacIntyre, Jr. | ............. 348/602 |
| 3,814,852 A | * 6/1974 | Mierzwinski | ............... 348/602 |
| 3,873,767 A | * 3/1975 | Okada et al. | ............... 348/673 |
| 3,928,867 A | * 12/1975 | Lynch | ......................... 348/673 |
| 3,955,892 A | 5/1976 | Numata et al. | |
| 4,006,485 A | 2/1977 | Yamanishi et al. | |
| 4,112,440 A | 9/1978 | Kanemaru | |

(List continued on next page.)

OTHER PUBLICATIONS

J. H. Krantz, "Visibility of Transmissive Liquid Crystal Displays Under Dynamic Lighting Conditions", Human Factors, 1992, 34(5), 615–632.

R. Merrifield & L. D. Silverstein, "The ABC's of Automatic Brightness Control", SID 88 Digest, 1988, pp. 178–181.

M. D. Fairchild, "Considering the Surround in Device—Independent Color Imaging", Color Research & Application, vol. 20, No. 6, Dec. 1995, pp. 352–363.

*Primary Examiner*—Matthew C. Bella
*Assistant Examiner*—Anthony Blackman
(74) *Attorney, Agent, or Firm*—David A. Novais (57) ABSTRACT

An apparatus and method is provided for dynamically modifying both the luminance and contrast of an image as it is displayed on a display unit in response to changing lighting conditions. Sensors are utilized to continually measure the luminance of the light illuminating the display unit and the display surround luminance. Measurement signals generated by the light sensors are processed to provide display luminance and contrast adjustment control signals that gradually cause the adjustment of the display unit's luminance and contrast in response thereto. Continual adjustment of the luminance and contrast of a display unit according to changing lighting conditions such that the brightness and contrast perception of the displayed image remains constant under the varying conditions. As a result, a number of advantages our obtained including: the brightness and contrast perception of images displayed on a display unit remains constant as the display device illumination changes; the brightness and contrast perception of images displayed on a display unit remains constant as the display unit surround luminance changes; and power consumption is decreased in dim environments.

10 Claims, 6 Drawing Sheets

U.S. PATENT DOCUMENTS

| | | | |
|---|---|---|---|
| 4,140,378 A | | 2/1979 | Suzuki et al. |
| 4,142,786 A | | 3/1979 | Suzuki et al. |
| 4,143,954 A | | 3/1979 | Numata et al. |
| 4,303,322 A | | 12/1981 | Someya |
| 4,386,345 A | | 5/1983 | Narveson et al. |
| 4,682,228 A | | 7/1987 | Ando et al. |
| 4,692,014 A | | 9/1987 | Kiuchi |
| 4,713,659 A | * | 12/1987 | Oyagi et al. ............... 340/7.55 |
| 4,760,389 A | | 7/1988 | Aoki et al. |
| 4,952,917 A | | 8/1990 | Yabuuchi |
| 4,965,574 A | | 10/1990 | Fukushima et al. |
| 5,057,744 A | * | 10/1991 | Barbier et al. ............. 348/602 |
| 5,144,292 A | | 9/1992 | Shiraishi et al. |
| 5,146,316 A | * | 9/1992 | Suzuki ....................... 348/227 |
| 5,347,293 A | | 9/1994 | Wiedemann et al. |
| 5,394,167 A | | 2/1995 | Migny |
| 5,404,193 A | | 4/1995 | Harada |
| 5,406,305 A | * | 4/1995 | Shimomura et al. ........ 345/102 |
| 5,534,920 A | | 7/1996 | Kim |
| 5,534,966 A | | 7/1996 | Miura |
| 5,850,205 A | * | 12/1998 | Blouin ....................... 345/102 |
| 5,854,617 A | * | 12/1998 | Lee et al. ................... 345/102 |
| 6,297,859 B1 | * | 10/2001 | George ....................... 348/747 |
| 6,327,708 B1 | * | 12/2001 | Monsees ....................... 725/12 |

* cited by examiner

AUTOMATIC LUMINANCE AND CONTRAST ADJUSTMENT AS FUNCTIONS OF AMBIENT/SURROUND LUMINANCE FOR DISPLAY DEVICE

CROSS-REFERENCE TO RELATED APPLICATIONS

This is a continuation of application Ser. No. 08/970,327 filed Nov. 14, 1997.

FIELD OF THE INVENTION

The present invention relates to an apparatus and method for automatically adjusting luminance and contrast of a display unit. Specifically, the present invention is directed to an apparatus and method that adjust luminance and contrast as functions of ambient and surround luminance.

BACKGROUND OF THE INVENTION

There are a variety of applications and devices in which a display unit is utilized to electronically display images. It is desirable to provide a display unit for such applications and devices that is capable of automatically adjusting luminance and contrast without the need for operator intervention. It is common, for example, to provide electronic cameras with image display units that must be utilized in a wide range of lighting conditions in which luminance levels vary greatly. Without some form of automatic adjustment, the operator must constantly change settings manually to compensate for changes in the lighting environment.

It has been well documented in the scientific literature that one's brightness and contrast perception of an image is significantly affected by the ambient and surround luminance in which it is viewed. See, for example, "Visibility of Transmissive Liquid Crystal Displays under Dynamic Lighting Conditions", J. H. Krantz, Human Factors, 1992, 34(5), 615–632, the contents of which are herein incorporated by reference. Brightness is defined as the attribute of a visual sensation according to which an area appears to emit more or less light. Contrast is defined as the rate of change of the brightness of image elements as a function of the relative luminance of the same image elements in the original scene. Differences in these perceived attributes can be related to the operator's state of visual adaptation to the ambient and surround luminance. For example, as the ambient luminance increases, the user begins to gradually adapt to the new light level by: a) reducing the amount of light which enters the eye; and b) reducing the sensitivity of the light-sensitive elements of the eye. The light entering the eye from the display unit, however, is also correspondingly reduced, thereby causing the display unit to appear dimmer to the operator. In response to this effect, the luminance of the display unit needs to be increased to maintain the operator's perception of the displayed image. Conversely, as the ambient luminance decreases, the operator begins to gradually adapt by: a) increasing the amount of light that enters the eye; and b) by increasing the sensitivity of the light-sensitive elements of the eye. In this case, the light entering the eye from the display device unit is also increased, thereby causing the display unit to appear brighter to the operator. The luminance of the display unit must then be decreased to maintain the user's perception of the displayed image.

Figure 1:
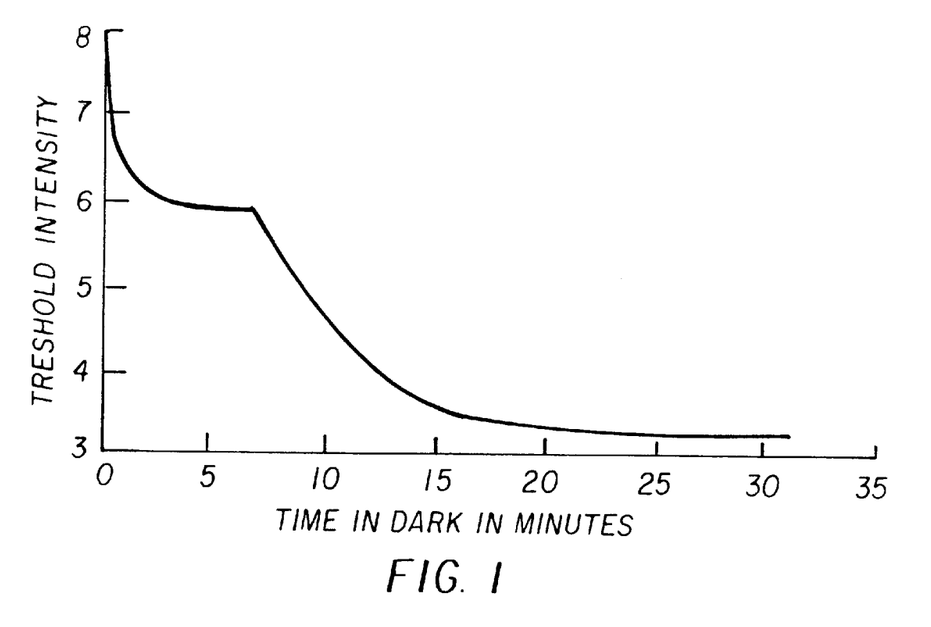
FIG. 1 is a plot of the adaptation response of the human visual system which shows the amount of time it takes to visually adapt to decreases in ambient luminance.
Figure 2:
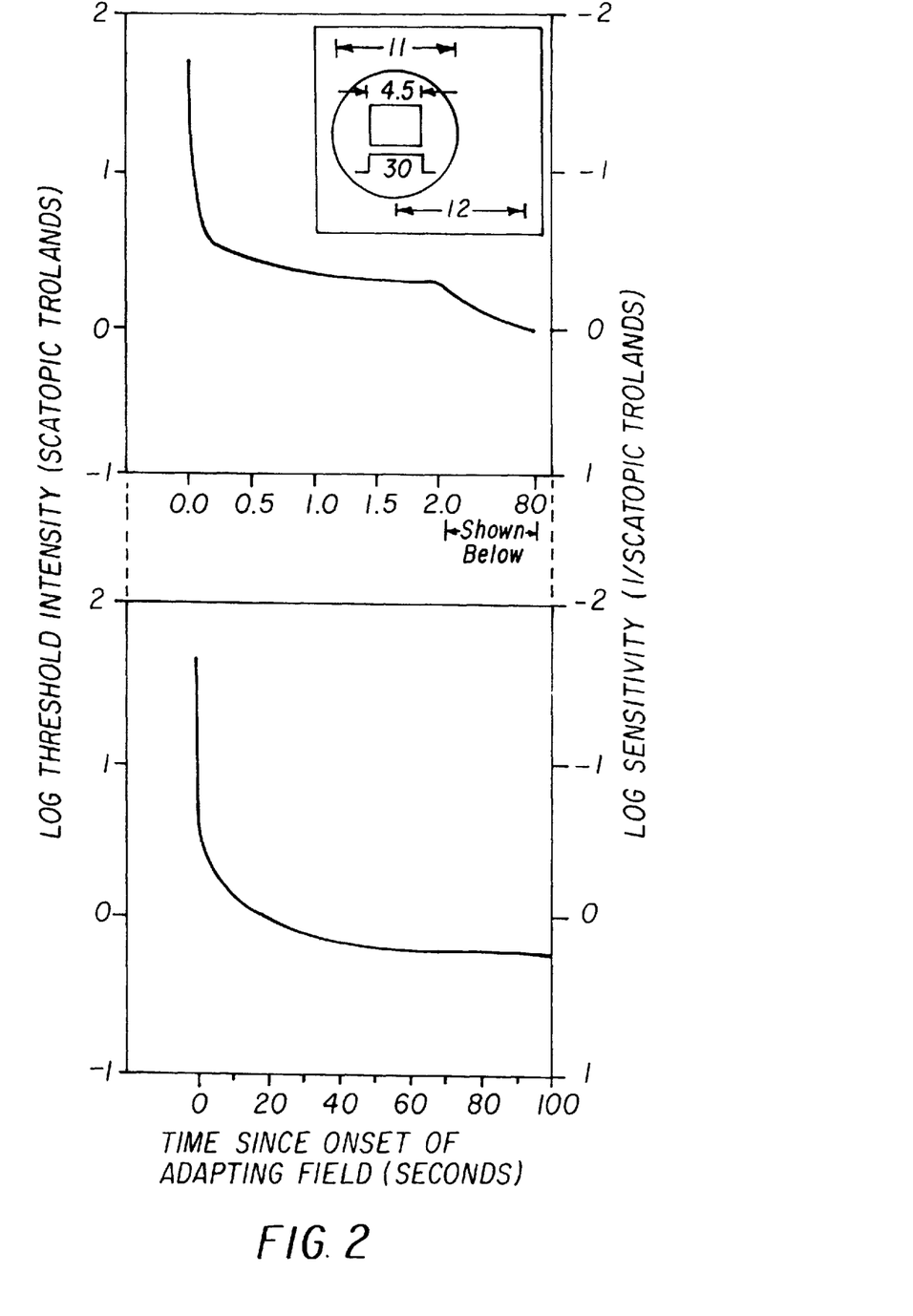
FIG. 2 is a plot of the adaptation response of the human visual system which shows the amount of time it takes to visually adapt to increases in ambient luminance.

While the eye adapts to changes in ambient luminance, the process of adaptation is not directly reversible. Instead, the human eye requires a significant period of time to adapt to changes when ambient luminance is decreased and a much shorter period to adapt to increases in ambient luminance. FIG. 1, for example, illustrates a plot of the darkness adaptation effect showing the amount of time it takes for an individual to visually adapt to changes in ambient luminance. As illustrated in FIG. 1, several minutes are required before the sensitivity of the eye reaches its full level of adaptation when the ambient luminance is decreased. FIG. 2 is a plot of the lightness adaptation effect showing the amount of time it takes for the eye to adapt to increased ambient luminance. As illustrated in FIG. 2, the eye's sensitivity changes dramatically over the first second after an increase in ambient luminance, continues to change significantly for a period of 20 to 30 seconds, and then changes very slightly thereafter.

Figure 3:
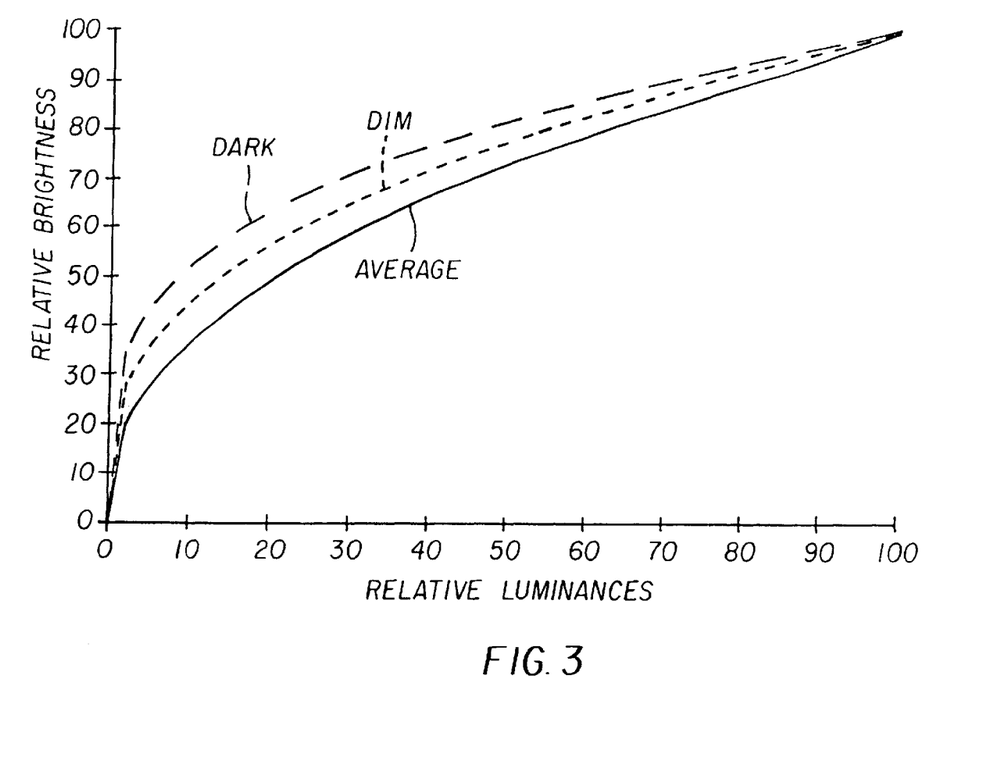
FIG. 3 is a plot which shows how the relative brightness of image elements vary as a function of their relative luminances for an average, dim, and darkly illuminated surround.

It has also been shown that the perceived contrast of an image changes as the luminance of the image surround changes. The surround of an image is defined as the area around an image extending from its edge in all directions. FIG. 3 is a plot which shows such an effect. The plot illustrates the relative brightness of image elements as a function of their relative luminances for an average, dim, and darkly illuminated surround, which shows that the perceived image contrast increases with increasing surround luminance and decreases with decreasing surround luminance.

It is also known that the physical luminance and contrast of the display unit will be affected by lighting conditions. Assuming that the display unit reflects light as if it were a perfectly Lambertian surface, it is known that the luminance of the display unit in any ambient environment can be analytically determined from the equation:

$$La = Ld + Lr$$

where La represents the luminance of the display unit in current ambient lighting conditions, Ld represents the luminance of the display unit in a perfectly dark environment, and Lr represents the reflected luminance of the display unit. If the amount of ambient illuminance is measured, Lr can be calculated from the equation:

$$Lr = I*R/\pi$$

where I is the ambient illuminance, R is the coefficient of reflection for the display device and $\pi$ is the arithmetic constant PI. The contrast of the display device can be determined by calculating La for a dark pixel and La for a fully lit pixel on the display device and then calculating the ratio of these parameters.

$$\text{Contrast of Display} = La^{fully\ lit\ pixel} / La^{dark\ pixel}$$

It should be noted that while R will usually be constant for most display units, this parameter may differ for dark and lit pixels for some display units such as liquid crystal displays.

Still further, researchers have found that the optimum display luminance is a function of display illumination level and this relationship can generally be explained by the equation:

$$\log L_d = a + b \log(I)$$

where $L_d$ is the display luminance, I is the illumination level, and a and b are constants fit to psychophysical data. See "The ABC's of Automatic Brightness Control", R. Merrifield and L. D. Silverstein, SID 88 Digest, 1988, pgs. 178–180, the contents of which are incorporated herein by reference.

In view of the above, it is an object of the invention to provide an apparatus and method of dynamically modifying both the luminance and contrast of an image as it is displayed on a display unit in response to changing lighting conditions.

SUMMARY OF THE INVENTION

The invention provides an apparatus and method for dynamically modifying both the luminance and contrast of an image as it is displayed on a display unit in response to changing lighting conditions. Sensors are utilized to continually measure the luminance of the light illuminating the display unit and/or the display surround luminance. Measurement signals generated by the light sensors are processed to provide display luminance and contrast adjustment control signals that gradually cause the adjustment of the display unit's luminance and contrast in response thereto.

More specifically, an apparatus for automatically controlling a display luminance and contrast of a display device is provided that includes an illumination measuring mechanism for measuring a display illumination of a display device; a surround luminance measuring mechanism for measuring a surround luminance of the display device; a calculating mechanism for calculating a current display luminance and a current contrast setting for the display device; a determining mechanism for determining a change in the display illumination and a change in the surround luminance based on measurements performed by the illumination measuring mechanism and the surround luminance measuring mechanism, respectively, a luminance adjustment mechanism for calculating an updated display luminance when the determining mechanism determines a change in the display illumination has occurred, and for adjusting the display luminance of the display device based on the updated display luminance to display an image, and a contrast adjustment mechanism for calculating an updated contrast setting when the determining mechanism determines a change in the surround luminance has occurred, and for adjusting the contrast of the display device based on the updated contrast setting to display the image.

In a preferred embodiment, the determining mechanism calculates the current display luminance based on a determination of whether an initial display illumination measured by the illumination measuring mechanism is different from a default display illumination stored in memory. Similarly, the determining mechanism preferably calculates the current contrast setting based on a determination of whether an initial surround luminance measured by the surround luminance measuring mechanism is different from a default surround luminance stored in memory.

Still further, the luminance adjustment mechanism calculates the updated display luminance based on the change in display illumination, and further performs a progressive time dependent adjustment of the display luminance based on whether the updated display luminance is higher or lower than the current display luminance. The luminance adjustment mechanism performs the progressive time dependent adjustment based on a degree of light adaptation when the updated luminance is higher than the current display luminance, and performs the progressive time dependent adjustment based on a degree of dark adaptation when the updated luminance is lower than the current display luminance.

The present invention provides continual adjustment of the luminance and contrast of a display unit according to changing lighting conditions such that the brightness and contrast perception of the displayed image remains constant under the varying conditions. As a result, a number of advantages are obtained including: the brightness and contrast perception of images displayed on a display unit remains constant as the display device illumination changes; the brightness and contrast perception of images displayed on a display unit remains constant as the display unit surround luminance changes; and power consumption is decreased in dim environments. Other advantages and features of the invention will become apparent from the following detailed description of the preferred embodiments of the invention.

BRIEF DESCRIPTION OF THE DRAWINGS

The invention will be described in greater detail with reference to certain preferred embodiments thereof and the accompanying drawings, where.

DETAILED DESCRIPTION OF THE INVENTION

Figure 4:
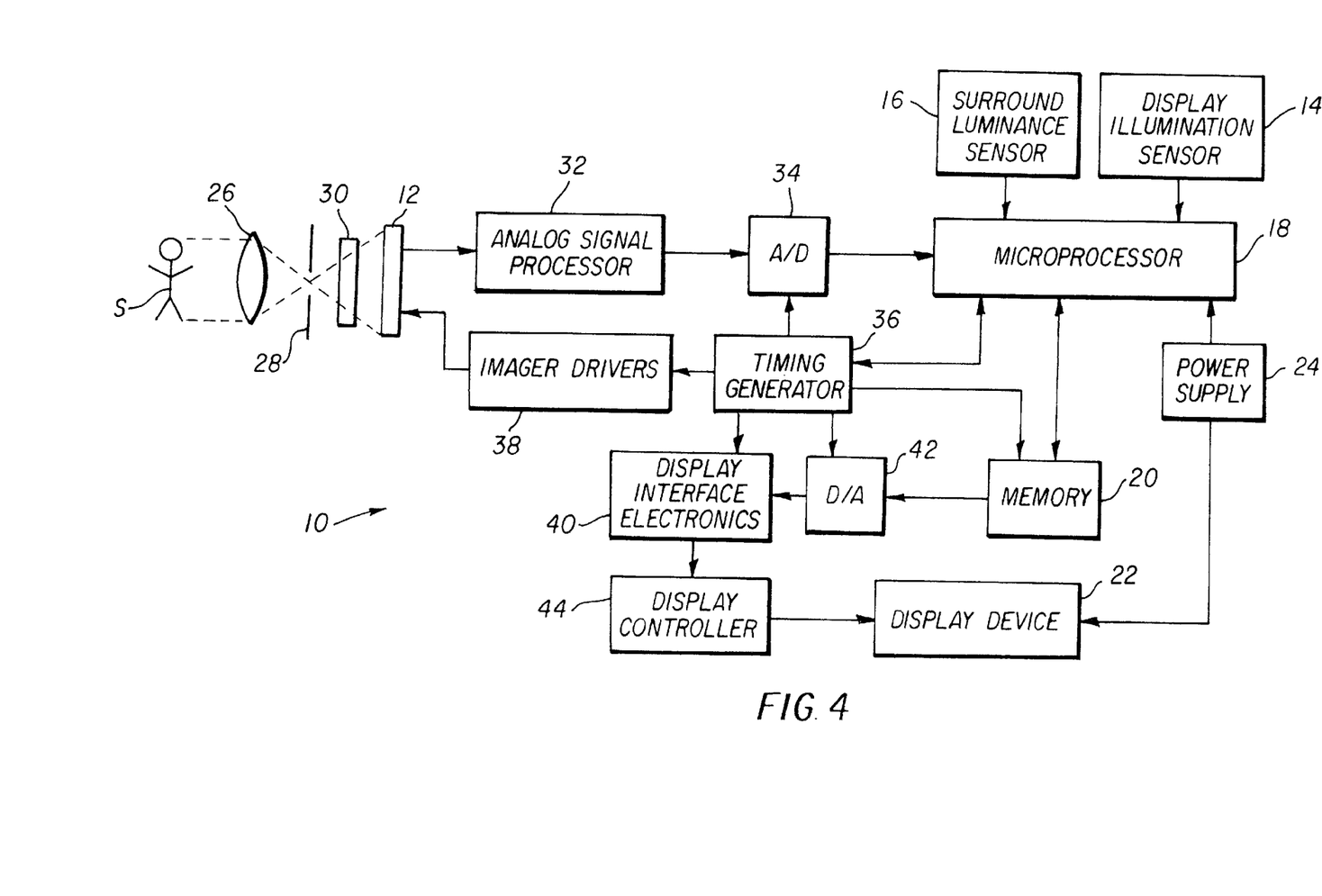
FIG. 4 is a block diagram of various elements of an electronic camera utilizing a display unit in accordance with the present invention.

FIG. 4 is a block diagram in schematic form of an electronic camera 10 utilizing a display device in accordance with the invention. The camera includes an area image sensor 12, a display illumination sensor 14, a surround luminance sensor 16, a microprocessor 18, a memory 20, and a display device 22. The area image sensor 12 generates image data in response to an imaged scene, as will be described in greater detail, and transfers the image data to the microprocessor 18 for subsequent storage in memory 20 and display on the display unit 22. In a preferred embodiment of the invention, the display illumination sensor 14 is utilized to obtain a measurement of the display illuminance and the surround luminance sensor 16 is utilized to obtain a measurement of the surround luminance. The display illuminance and surround luminance measurements are supplied to the microprocessor 18 which determines the appropriate luminance and contrast of the display device 22. The process of display illuminance measurement, surround luminance measurement, image processing, and image display preferably continues as long as power is supplied to the display device 22 by the power supply 24. and contrast of the display device 22. The process of display illuminance measurement, surround luminance measurement, image processing, and image display preferably continues as long as power is supplied to the display device 22 by the power supply 24.

In operation, an image of a subject focused by a lens 26 passes through an aperture plate 28 and a low pass filter 30, which can be made of a crystalline material or include a transport substrate with various transparent spots formed on the surface of the substrate. The area image sensor 12, under the control of the microprocessor 18, delivers analog signals to an analog signal processor 32. The analog signal processor 32 applies its output to an analog-to-digital converter (A/D) 34 which is under control of a timing generator 36. The digitized signals generated by the A/D 34 are received by the microprocessor 18 and are placed in appropriate memory locations as stored pixels in the memory 20. Conventional imager drivers 38 that provide drive signals to the area image sensor 12 are also controlled by the timing generator 36. In addition, the timing generator 36 provides control signals to display interface electronics 40 and to a digital-to-analog converter (D/A) 42, as well as to the memory 20. The timing generator causes stored pixels to be delivered to the digital-to-analog converter 42 which converts the pixels to an analog image signal that is supplied to the display interface electronics 40. Display interface electronics 40 provides its output to a display controller 44 which, in turn, provides appropriate analog information to the display device 22.

Figure 5:
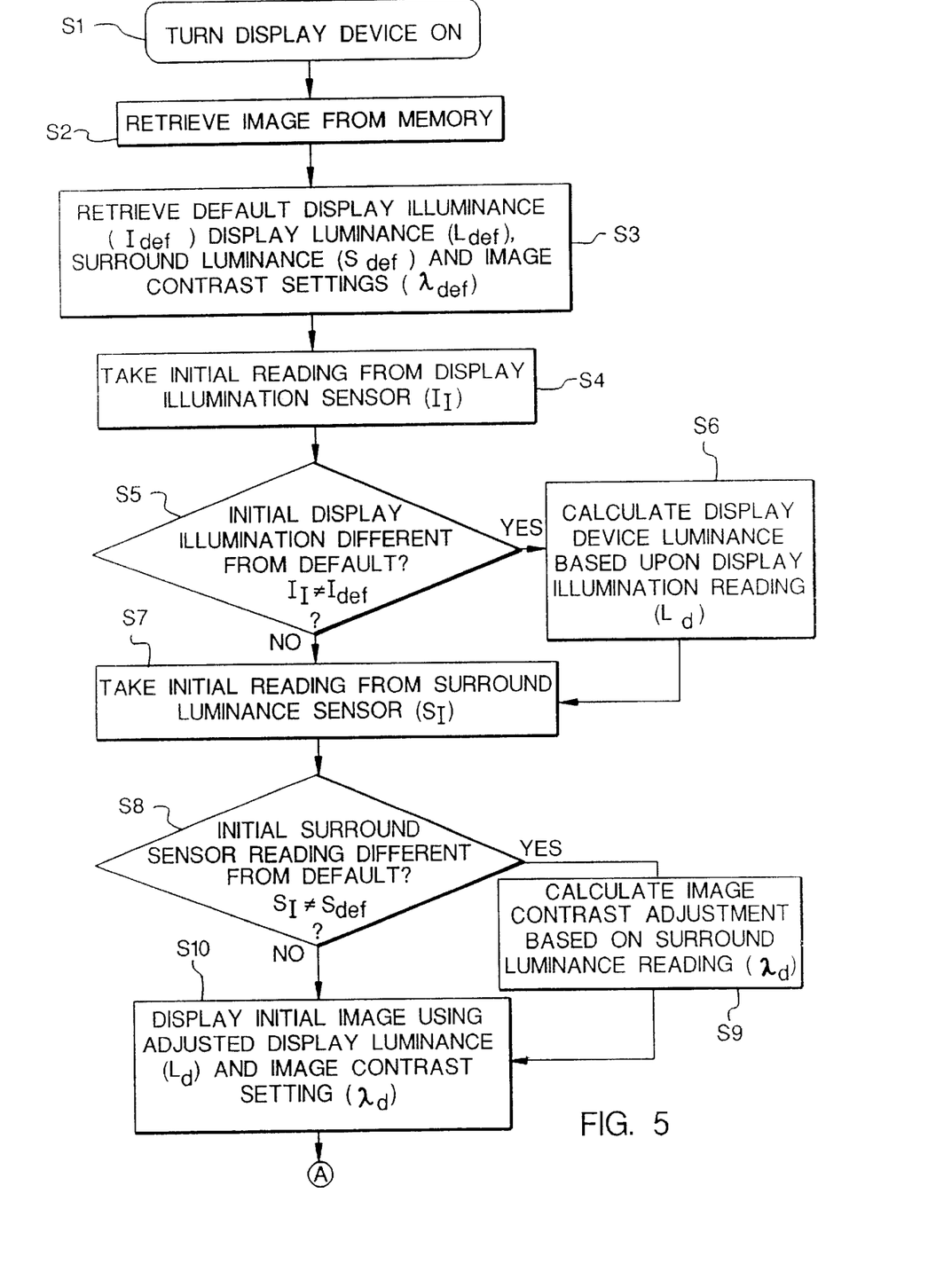
FIGS. 5 and 6 are flow diagrams illustrating the operation of the electronic camera shown in FIG. 4.

FIG. 5 illustrates in flow diagram form the processing provided by the microprocessor 18 on a digital image sensor image already stored in the memory 20. It will be understood that the steps set forth below can be employed on a computer readable storage medium. The computer readable storage medium may comprise, for example, magnetic storage media such as magnetic disc (such as a floppy disc) or magnetic tape; optical storage media such as optical disc, optical tape, or machine readable bar code; solid state electronic storage devices such as random access memory (RAM), or read only memory (ROM); or any other physical device or medium employed to store a computer program.

In accordance with an embodiment of the invention, a digital image produced by the camera of FIG. 4 is stored in memory 20. The first step (S1) is to turn the power on to both the camera 10 and the display device 22. The image to be displayed is then retrieved (S2) from the memory 20 by the microprocessor 18. Next, the microprocessor 18 retrieves default values (S3) from the memory 20 for the display illuminance ($I_{def}$), the surround luminance ($S_{def}$), the display luminance ($L_{def}$) and image contrast settings $\lambda_{def}$. An initial display illuminance reading ($I_1$) is then taken from the display illumination sensor 14 (S4). A decision is made (S5) if the measured initial display illumination reading is different from its default value. If the answer is "yes", then the current luminance of the display device 22 is calculated based upon the display illumination reading (S6) using the equation:

$$\log L_d = a + b \log(I)$$

previously described above. The display device 22 will be adjusted to produce a luminance value that is as close to the calculated value as possible. Adjustment can be accomplished in a number of ways depending on the display technology. In some devices, the value is obtained by adjusting the power input to each element in the display by adjusting its drive voltage and/or current supplied to each element. In a backlit display, for example a backlit LCD display, the power to the backlight is adjusted. An initial reading is then taken from the surround luminance sensor 16 (S7). A decision is made to determine if the measured initial surround luminance reading is different from its default value (S8). If the answer is "yes", then the contrast of the image on the display device 22 is adjusted based on the surround luminance reading (S9) by calculating the luminance at each gray level Y(x) from the equation:

$$\log Y(x) = \log L_{dmax} + 1/\lambda (\log((L(x)+16)/116))$$

where x represents each gray level, L(x) is the desired perceived luminance of the display at each gray level, Y(x) is the physical luminance of the display at each gray level, $L_{dmax}$ is the peak luminance value of the display, and λ is a contrast parameter that is adjusted based on the surround luminance. The value of the contrast parameter is calculated from an equation in the following form:

$$\lambda_d = aS^c + b$$

where a, b and c are constants that are derived by fitting the data points obtained from any number of psychophysical experiments and S is the luminance detected from the surround luminance sensor. The image is then displayed on the display device 22 using the adjusted current values for the display device luminance and contrast setting (S10).

Figure 6:
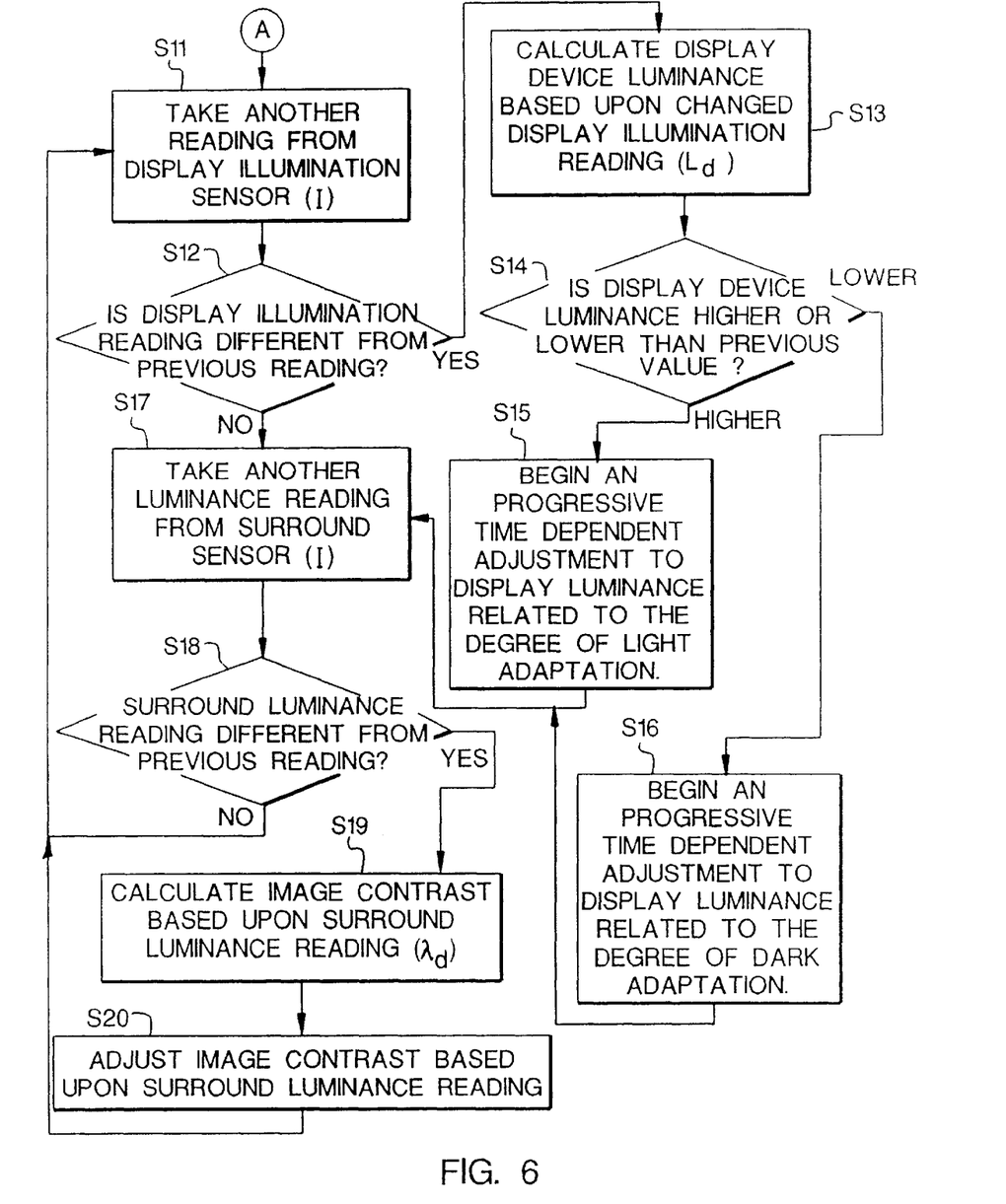

From this point on, the display luminance and contrast setting of the display device 22 are continually updated in response to changes in the readings from the display illumination sensor 14 and the surround luminance sensor 16 in a looping fashion as defined by the balance of the flow diagram. Namely, as shown in FIG. 6, another reading from the display illumination sensor 14 is taken (S11) and a decision is made as to whether the reading is different from the previous reading (S12). If the answer is yes, then the amount of difference from the previous display luminance is calculated (S13) and a determination is made as to whether the new value is higher or lower than the previous value (S14). A progressive time dependent adjustment to the display luminance is then made in relation to whether a degree of light adaptation or dark adaptation is required (S15, S16), as an observer will adapt to changes in the environment as the ambient environment changes. Through the adaptation process, the observer becomes gradually more sensitive to light when adapting to darker environments and gradually less sensitive to light when adapting to brighter environments. To determine the time dependent adjustments, the change in display illumination is detected, the change in luminance that is required for complete adaptation is calculated, and the time dependent adjustments to the display luminance are determined from the curves describing the rate of lightness and darkness adaptation (See FIGS. 1 and 2) and progressively applied to the display unit the complete adaptation luminance value is reached. A further reading is then taken (S17) from the surround luminance sensor 16 and a decision is made as to whether the reading is different from its previous reading (S18). If the answer is yes, then image contrast is calculated based upon surround luminance (S19) and an adjustment or updating of image contrast is made (S20). This process of updating the display luminance and contrast of the image on the display device 22 is continued until power is turned off.

The invention has been described with reference to certain preferred embodiments thereof. It will be understood, however, that modifications and variations are possible within the scope of the appended claims. For example, while the illustrated embodiment shows the use of a separate display illumination sensor and a surround luminance sensor to measure illumination and surround luminance, an equivalent means for performing this function would be the use of a single sensor that directly measures either illumination or surround luminance, with the other value being estimated based on the direct measurement. Namely, one direct measurement can be made with one sensor and the microprocessor then calculates the other value from the direct measurement, based on the assumption that the surround area has a certain amount of reflectance. If the display illuminance measurement is taken directly, the surround luminance value can be calculated from that measurement and an assumed surround reflectance. Similarly, if a luminance measurement is directly taken, the display illumination can be calculated from the measurement and an assumed surround reflectance. Other variations are also possible, including adjusting contrast in a progressive manner similar to the adjustment of luminance. The invention is applicable to different types of display devices and may be readily employed in a variety of devices that utilize electronic imaging.

PARTS LIST 10 digital camera
12 area image sensor
14 display illumination sensor
16 surround luminance sensor
18 microprocessor
20 memory
22 display unit
24 power supply
26 lens
28 aperture plate
30 low pass filter
32 analog signal processor
34 analog-to-digital converter (A/D)
36 timing generator
38 imager drivers
40 display interface electronics
42 digital-to-analog converter (D/A)
44 display controller

What is claimed is:

1. An apparatus for automatically controlling a display luminance and contrast of a display device, the apparatus comprising:
   a) an illumination measuring mechanism for measuring a display illumination of a display device;
   b) a surround luminance measuring mechanism for measuring a surround luminance of an area which surrounds the display device;
   c) a calculating mechanism for calculating a current display luminance and a current contrast setting for the display device;
   d) a determining mechanism for determining a change in the display illumination and a change in the surround luminance based on measurements performed by the illumination measuring mechanism and the surround luminance measuring mechanism, respectively;
   e) a luminance adjustment mechanism for calculating an updated display luminance when the determining mechanism determines that a change in the display illumination has occurred, and for adjusting the display luminance of the display device based on the updated display luminance to display an image; and
   f) a contrast adjustment mechanism for calculating an updated image contrast when the determining mechanism determines that a change in the surround luminance has occurred, and for adjusting the image contrast on the display device based on the updated contrast setting to display the image;
   wherein the current display luminance is replaced with the updated display luminance and the current contrast setting is replaced with the updated contrast setting; and
   wherein the luminance adjustment mechanism calculates the updated display luminance based on the change in display illumination, and further performs a progressive time dependent adjustment of the display luminance based on whether the updated display luminance is higher or lower than the current display luminance.

2. An apparatus as claimed in claim 1, wherein the determining mechanism calculates the current display luminance based on a determination of whether an initial display illumination measured by the illumination measuring mechanism is different from a default display illumination stored in memory.

3. An apparatus as claimed in claim 1, wherein the determining mechanism calculates the current contrast setting based on a determination of whether an initial surround luminance measured by the surround luminance measuring mechanism is different from a default surround luminance stored in memory.

4. An apparatus comprising:
   a) imaging means for generating electronic image data corresponding to an imaged scene;
   b) a display means for displaying the electronic image data generated by the imaging means;
   c) illumination measuring means for measuring a display illumination of a display device;
   d) surround luminance measuring means for measuring a surround luminance of an area around the display device; and
   e) control means for controlling a display luminance and contrast of the display means, wherein said control means includes:
      i) calculating means for calculating a current display luminance and a current contrast setting for the display device;
      ii) determining means for determining a change in the display illumination and a change in the surround luminance based on measurements performed by the illumination measuring means and the surround luminance measuring means, respectively;
      iii) luminance adjustment means for calculating an updated display luminance when the determining means determines that a change in the display illumination has occurred, and for adjusting the display luminance of the display device based on the updated display luminance to display an image; and
      iv) contrast adjustment means for calculating an updated contrast setting when the determining means determines that a change in the surround luminance has occurred, and for adjusting the contrast of the display device based on the updated contrast setting to display the image;
   wherein the current display luminance is replaced with the updated display luminance and the current contrast setting is replaced with the updated contrast setting; and
   wherein the luminance adjustment means calculates the updated display luminance based on the change in display illumination, and further performs a progressive time dependent adjustment of the display luminance based on whether the updated display luminance is higher or lower than the current display luminance.

5. An apparatus as claimed in claim 4, wherein the determining means calculates the current display luminance based on a determination of whether an initial display illumination measured by the illumination measuring means is different from a default display illumination stored in a memory.

6. An apparatus as claimed in claim 4, wherein the determining means calculates the current contrast setting based on a determination of whether an initial surround luminance measured by the surround luminance measuring means is different from a default surround luminance stored in memory.

7. A method of controlling a display luminance and contrast of a display device comprising:
   a) measuring a display illumination of a display device;
   b) measuring a surround luminance of an area around the display device;
   c) calculating a current display luminance and a current contrast setting for the display device;
   d) determining a change in the display illumination and a change in the surround luminance;
   e) calculating an updated display luminance when a change in the display illumination has occurred;
   f) adjusting the display luminance of the display device based on the updated display luminance to display an image;
   g) calculating an updated contrast setting when a change in the surround luminance has occurred;
   h) adjusting the contrast of the display device based on the updated contrast setting to display the image; and
   i) replacing the current display luminance with the updated display luminance and the current contrast setting with the updated contrast setting;
   wherein the updated display luminance is calculated based on a change in display illumination, and a progressive time dependent adjustment of the display luminance is performed based on whether the updated display luminance is higher or lower than the current display luminance.

8. A method as claimed in claim 7, wherein the current display luminance is calculated based on a determination of whether a measured initial display illumination is different from a default display illumination stored in memory.

9. A method as claimed in claim 7, wherein the current contrast setting is calculated based on a determination of whether a measured initial surround luminance is different from a default surround luminance stored in memory.

10. An apparatus for automatically controlling a display luminance and contrast of a display device, the apparatus comprising:
   a display illumination sensor adapted to measure a display illumination of a display device;
   a surround luminance sensor adapted to measure a surround luminance of an area around the display device; and
   a microprocessor adapted to:
      calculate a current display luminance and a current contrast setting for the display device;
      determine a change in the display illumination and a change in the surround luminance based on measurements performed by the display illumination sensor and the surround luminance sensor, respectively;
      calculate an updated display luminance when it is determined that a change in the display illumination has occurred, and adjust the display luminance of the display device based on the updated display luminance to display an image; and
      calculate an updated image contrast when it is determined that a change in the surround luminance has occurred, and adjust the image contrast on the display device based on the updated contrast setting to display the image;
   wherein the current display luminance is replaced with the updated display luminance and the current contrast setting is replaced with the updated contrast setting; and
   wherein the microprocessor is further adapted to calculate the updated display luminance based on the change in display illumination, and further performs a progressive time dependent adjustment of the display luminance based on whether the updated display luminance is higher or lower than the current display luminance.

* * * * *